US009965469B2

(12) United States Patent
Fink et al.

(10) Patent No.: US 9,965,469 B2
(45) Date of Patent: May 8, 2018

(54) DYNAMIC TOKEN TRANSLATION FOR NETWORK INTERFACES

(71) Applicant: International Business Machines Corporation, Armonk, NY (US)

(72) Inventors: Patrick W. Fink, Charlotte, NC (US); Kristin E. McNeil, Charlotte, NC (US); Philip E. Parker, York, SC (US); David B. Werts, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/078,226

(22) Filed: Mar. 23, 2016

(65) Prior Publication Data
US 2017/0277682 A1     Sep. 28, 2017

(51) Int. Cl.
*G06F 17/20* (2006.01)
*G06F 17/28* (2006.01)
*G06F 17/27* (2006.01)
*G06K 9/00* (2006.01)

(52) U.S. Cl.
CPC .......... *G06F 17/289* (2013.01); *G06F 17/274* (2013.01); *G06F 17/2765* (2013.01); *G06K 9/00469* (2013.01)

(58) Field of Classification Search
CPC ......................................... G06F 17/20–17/289
See application file for complete search history.

(56) References Cited

U.S. PATENT DOCUMENTS

| | | | |
|---|---|---|---|
| 8,200,290 B2 | 6/2012 | Chen | |
| 8,346,536 B2 | 1/2013 | Jiang et al. | |
| 8,543,571 B2 | 9/2013 | Baessler et al. | |
| 9,020,999 B2 | 4/2015 | Rai Bhatti | |
| 2003/0163473 A1 | 8/2003 | Miller et al. | |
| 2004/0205118 A1 | 10/2004 | Yu | |
| 2005/0120303 A1* | 6/2005 | Behbehani | G06F 17/243 715/201 |
| 2006/0248071 A1* | 11/2006 | Campbell | G06F 17/211 |
| 2007/0067294 A1 | 3/2007 | Ward et al. | |
| 2008/0040094 A1* | 2/2008 | Wolgemuth | G06F 17/289 704/2 |
| 2013/0097166 A1 | 5/2013 | Fink et al. | |

(Continued)

*Primary Examiner* — Keith D Bloomquist
(74) *Attorney, Agent, or Firm* — Ryan Lewis; Edell, Shapiro & Finnan, LLC

(57) ABSTRACT

According to an embodiment of the present invention, a system dynamically produces a document with transformed terms associated with a geographic location, and comprises a computer system including at least one processor. The system analyzes a retrieved document to identify one or more terms with equivalent expressions in the same natural language. Each of the identified terms is transformed into an equivalent expression based on at least a geographic location associated with a user. The system produces a transformed document by replacing the identified one or more terms in the retrieved document with the equivalent expressions associated with the geographic location. Embodiments of the present invention further include a method and computer program product for dynamically producing a document with transformed terms for a geographic location in substantially the same manner described above.

20 Claims, 15 Drawing Sheets

```
H-->A-->L-->F--><Terminal State>

<Terminal State>
->Operation:
    Add <MultiplierValueAnnotation>

<MultiplierValueAnnotation>
-> Features
    Multiplier Value: 0.5
```

(56) References Cited

U.S. PATENT DOCUMENTS

| | | | |
|---|---|---|---|
| 2014/0006925 A1* | 1/2014 | Bassemir | G06F 17/218 |
| | | | 715/234 |
| 2014/0040741 A1* | 2/2014 | van Os | G06F 17/276 |
| | | | 715/719 |
| 2014/0095562 A1* | 4/2014 | Rai Bhatti | G06F 17/2276 |
| | | | 708/206 |
| 2014/0229467 A1 | 8/2014 | Roseman et al. | |
| 2015/0019203 A1 | 1/2015 | Smith et al. | |
| 2015/0208900 A1 | 7/2015 | Vidas et al. | |
| 2016/0371244 A1* | 12/2016 | Chakra | G06F 17/246 |

* cited by examiner

505

| WORD | VALUE ($) | WEIGHT (g) | VOLUME (mm₃) | COLOR | OPERATOR TYPE |
|---|---|---|---|---|---|
| DIME | 0.10 | 2.268 | 340.1 | SILVER | VALUEDTYPE |
| QUARTER | 0.25 | 5.670 | 808.5 | SILVER | VALUEDTYPE |
| NICKEL | 0.05 | 5.000 | 719.0 | SILVER | VALUEDTYPE |
| PENNY | 0.01 | 2.500 | 348.0 | BROWN | VALUEDTYPE |

| WORD | VALUE | OUTPUT TYPE |
|---|---|---|
| HALF | 0.5 | OPERATORTYPE |
| QUARTER | 0.25 | OPERATORTYPE |

| WORD | VALUE | UNIT | OUTPUT TYPE |
|---|---|---|---|
| CENTURY | 100 | YEARS | VALUEDTYPE |
| DECADE | 10 | YEARS | VALUEDTYPE |
| POUND | 16 | OUNCES | VALUEDTYPE |

| WORD | REGION 1 | REGION 2 | REGION 3 | REGION 4 |
|---|---|---|---|---|
| SODA | POP | COLA | SOFT DRINK | SODA POP |
| POP | POP | COLA | SOFT DRINK | SODA POP |

| WORD | READING LEVEL 1 | READING LEVEL 2 |
|---|---|---|
| QUICK | FAST | AGILE |
| BROWN | CHOCOLATE | COCOA |
| LAZY | TIRED | SLOVENLY |

FIG.5E

S-->O-->D-->A--><Terminal State>
<Terminal State>
-->Operation:
   Add <DictionaryBeverageAnnotation>

<DictionaryBeverageAnnotation>
--> Localization Features
Columns: Region 1  Region 2  Region 3  Region 4
  Values: Pop      Cola     Soft Drink  Soda Pop

FIG.8A

H-->A-->L-->F--><Terminal State>

<Terminal State>
->Operation:
  Add <MultiplierValueAnnotation>

<MultiplierValueAnnotation>
-> Features
  Multiplier Value: 0.5

FIG.8B

C-->E-->N-->T-->U-->R-->Y--><Terminal State>

<Terminal State>
->Operation:
  Add <ValuedAnnotation>

<ValuedAnnotation>
-> Features
  Value: 100
    Unit: Years

| WORD | VALUE | UNIT | OUTPUT TYPE |
|---|---|---|---|
| CENTURY | 100 | YEARS | VALUEDTYPE |

520

| WORD | VALUE | OUTPUT TYPE |
|---|---|---|
| HALF | 0.5 | OPERATORTYPE |

INPUT TEXT:

The effect lasted [half] a [century.]

The effect lasted [half a century.]

| Phrase | CalculatedValue |
|---|---|
| Half a century | 50 years |

FIG.9

<DictionaryBeverageAnnotation> --> <Terminal State>

<Terminal State>
->Operation:
    Add <TranslatableAnnotation>

<TranslatableAnnotation>
    - indicates replacement of token with
equivalent term from features based on parameters

FIG.11A

<MultiplierValueAnnotation> --> <Token {1,2}> -->
<ValuedAnnotation> --> <Terminal State>
where {1,2} is defined as repeating 1 up to 2 times <Terminal State>
-> Operation:
  Add <OperationValueAnnotation>
<OperationValueAnnotation>
   -> Features Product: 50 (multiply <MultiplierValueAnnotation>
by <ValuedAnnotation> from the annotations for the
tokens in the pattern (0.5 (half) and 100 (century))

Units: Years

FIG.11B

DYNAMIC TOKEN TRANSLATION FOR NETWORK INTERFACES

BACKGROUND

1. Technical Field

Present invention embodiments relate to network interfaces, and more specifically, to dynamic translation for network interfaces using natural language processing.

2. Discussion of the Related Art

With the significant growth of Web-based content in multinational environments, homogenized data has become increasingly important for businesses, intelligence agencies, governments and personal users, allowing them to better understand and comprehend the content they consume. For example, personal users may readily view and interact with webpages in different languages and dialects. With respect to an intelligence agency, a website translated into homogenized data may assist in criminal investigations or intelligence gathering. In addition, homogenized webpages may allow multinational businesses to market and sell their goods and services in a broad variety of locales. Unfortunately, eighty percent of the world's Web-based content is in an unstructured form, i.e., in language or colloquialisms associated with the specific location in which the content was created. As such, location-specific colloquialisms persist in a significant portion of today's Web-based content, which geographically restricts understanding of the content information, and impedes the transfer of knowledge across multinational environments.

SUMMARY

According to an embodiment of the present invention, a system dynamically produces a document with transformed terms associated with a geographic location, and comprises a computer system including at least one processor. The system analyzes a retrieved document to identify one or more terms with equivalent expressions in the same natural language. Each of the identified terms is transformed into an equivalent expression based on at least a geographic location associated with a user. The system produces a transformed document by replacing the identified one or more terms in the retrieved document with the equivalent expressions associated with the geographic location. Embodiments of the present invention further include a method and computer program product for dynamically producing a document with transformed terms for a geographic location in substantially the same manner described above.

BRIEF DESCRIPTION OF THE DRAWINGS

FIGS. 5A-5E are illustrations of example dictionaries according to an embodiment of the present invention.

FIGS. 8A-8C are illustrations of example annotations for tokens according to an embodiment of the present invention.

FIG. 9 is a diagrammatic illustration of a manner in which rule processing is implemented to transform an expression according to an embodiment of the present invention.

FIGS. 11A and 11B are illustrations of example annotations for token patterns according to an embodiment of the present invention.

DETAILED DESCRIPTION

Figure 1:
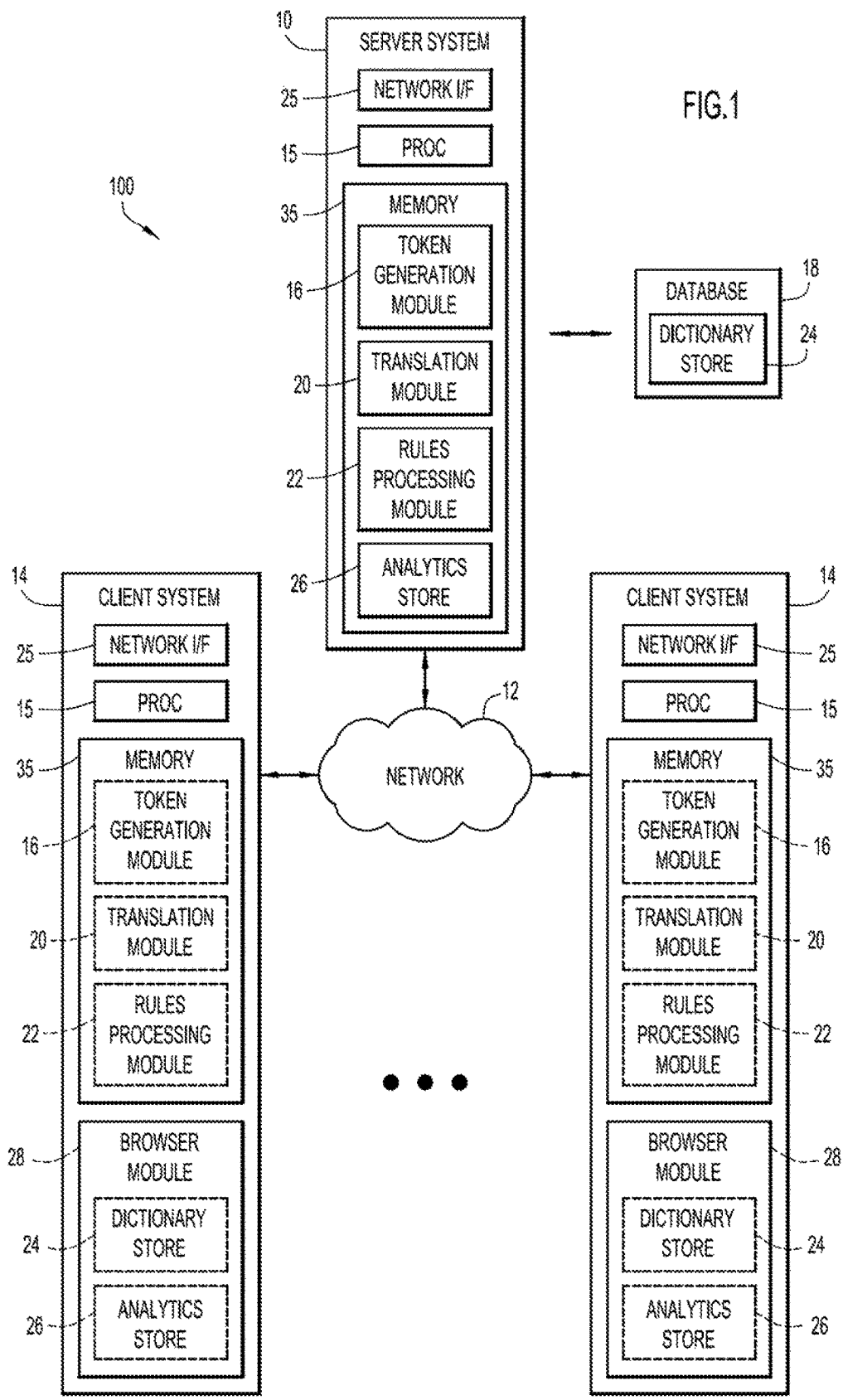
FIG. 1 is a diagrammatic illustration of an example computing environment for use with an embodiment of the present invention.

Present invention embodiments dynamically produce a document with terms translated according to the prevailing meanings and customs for a given geographic location. A document comprising text and other information is retrieved, analyzed, and translated. For example, a user may visit a webpage to view a document containing text, symbols, and/or measurements that are in a language, dialect, or value unfamiliar, unknown, or rarely used by the user. The text and symbols within the document are dynamically analyzed in real-time by one or more analysis techniques using a top-down heuristic searching algorithm to extract individual words, symbols, and/or measurements from the document. The extracted information is analyzed by one or more natural language processing ("NLP") translation techniques that match the extracted information with a corresponding term, symbol, or value within one or more dictionaries based on location information indicating the location of the user.

The dictionaries further comprise features associated with the terms and symbols to transform the extracted information according to rules into terms, measurements, and symbols most likely to be understood by the user. For example, the dictionary may include an average measurable value of a unit of measurement for which one or more natural language processing translation techniques may replace, or display alongside, the corresponding unit of measurement in the translated document that the system presents to the user. The resulting document represents the information from the original document translated into the characteristics or style (e.g., language, dialect, colloquialisms, etc.) associated with the location information of the user.

The analysis techniques may optionally transform the extracted information into terms, symbols, and/or measurements corresponding to the stored preferences and determined reading level of the user, as well as the location information of the requesting system and/or user device. For example, the phrase "size of a dime" may be converted to the average size of a dime in centimeters, while the phrase the "color blue" may be converted to a red-green-blue (RGB) value or range for the color blue. Further, the phrase "pea sized spot of glue" may be converted to the average size of a pea in centimeters, and the phrase "half a century ago" may be converted to "50 years ago".

Present invention embodiments utilize text analytics to perform text analysis of a document in order to transform the document text into information most likely to be relevant to a user in a particular location or region (e.g., country, region, city, neighborhood, etc.). The translated information may be readily understood by the user, and may facilitate multinational communications and business transactions, as well as marketing campaigns, criminal investigations, and other governmental civic campaigns in an effort to deliver more personalized information and produce higher returns on marketing expenses.

An example computing environment for use with present invention embodiments is illustrated in FIG. 1. Specifically, environment 100 includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardware, wireless link, Intranet, etc.).

Client systems 14 enable users to retrieve documents (e.g., webpages, data files, etc.) from server systems 10, allowing the users to consume information corresponding to the retrieved documents. The server systems may include a token generation module 16, a translation module 20, a rules processing module 22, and an analytics store 26 (e.g., a content analytics store (CAS)). Token generation module 16 generates tokens and annotations for terms, symbols, and/or units of measurement retrieved from the original text of a document and analyzes the tokens in view of one or more dictionaries stored in a dictionary store 24. The dictionaries enable natural language processing (NLP) of the document text to translate or transform terms as described below. Rules processing module 22 identifies patterns of tokens within the document text to apply corresponding rules for conversions, and translation module 20 determines equivalent expressions or values associated with the tokens or token patterns based on corresponding annotations. Analytics store 26 stores the tokens, token patterns, and corresponding annotations utilized by the translation module to produce a resulting document for display to the requesting system and/or user device.

A database system 18 may store various information for contextual analysis (e.g., user profiles, location information, etc.). Dictionary store 24 may reside in database system 18 or in memory of server systems 10 and/or client systems 14. The database system may be implemented by any conventional or other database or storage unit, may be local to or remote from server systems 10 and client systems 14, and may communicate via any appropriate communication medium (e.g., local area network (LAN), wide area network (WAN), Internet, hardware, wireless link, Intranet, etc.). The client systems may present a graphical user (e.g., GUI, etc.) or other interface (e.g., command line prompts, menu screens, etc.) to solicit information and/or documents from server systems 10.

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, token generation module, translation module, rules processing module, browser/interface software, etc.).

Alternatively, one or more client systems 14 may analyze documents and dynamically transform extracted information into terms, symbols, and/or units of measurements associated with a user location, preferences, and/or reading level. The client systems may include token generation module 16, translation module 20, rules processing module 22, dictionary store 24, and analytics store 26 as described above. The client systems may further include a browser module 28 that may display a graphical user interface (e.g., GUI, etc.) or other interface (e.g., command line prompts, menu screens, etc.) to solicit information from a corresponding user to retrieve documents stored on server systems 10. Dictionary store 24 and analytics store 26 may reside in browser module 28, or in memory 35 of client systems 14.

Token generation module 16, translation module 20, rules processing module 22, and browser module 28 may include one or more modules or units to perform the various functions of present invention embodiments described below. The various modules (e.g., token generation module, translation module, rules processing module, etc.) may be implemented by any combination of any quantity of software and/or hardware modules or units, and may reside within memory 35 of the server and/or client systems for execution by processor 15.

Figure 2:
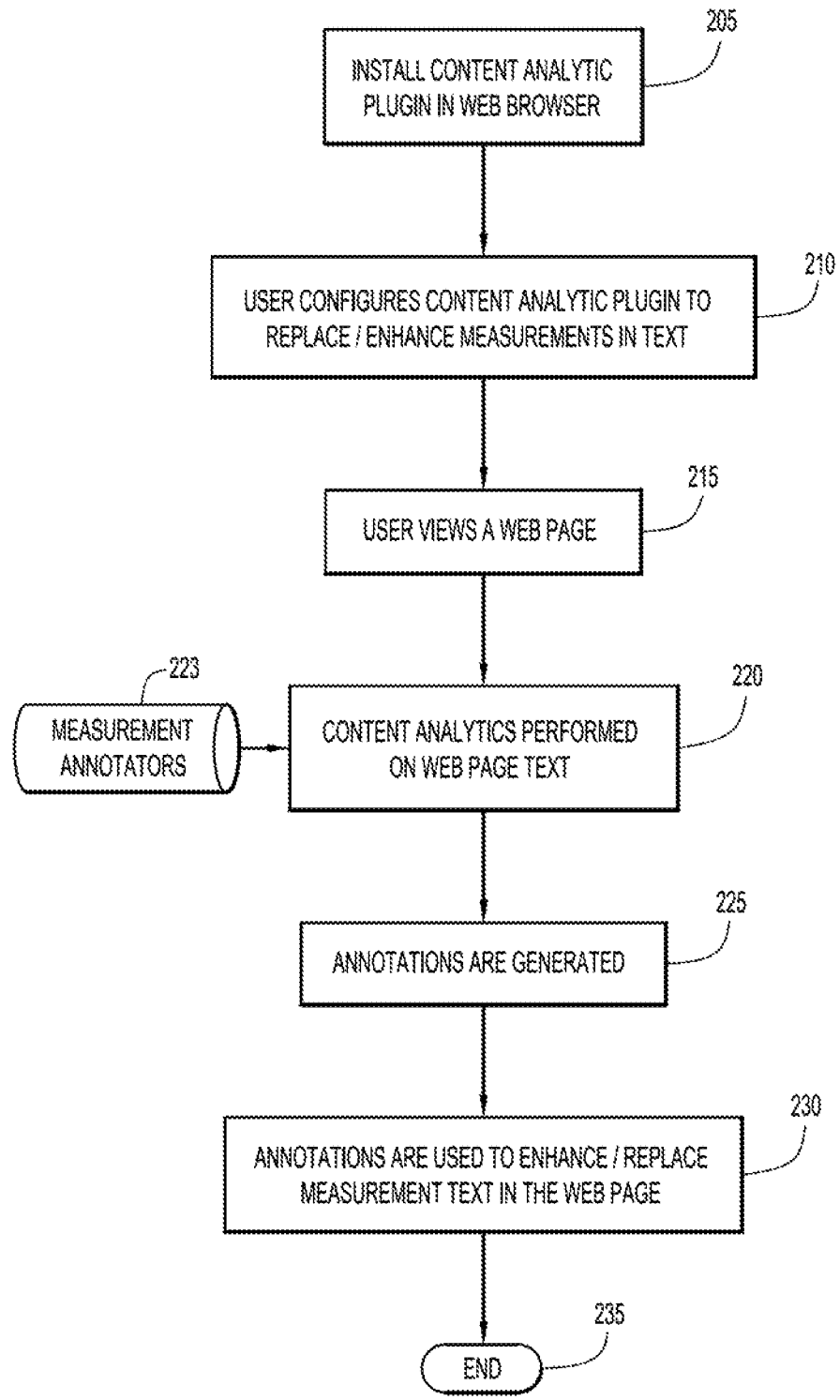
FIG. 2 is a procedural flow chart illustrating a manner in which documents are dynamically produced with translated terms according to an embodiment of the present invention.

A manner in which documents are dynamically produced with translated terms is illustrated in FIG. 2. Initially, a user may install a content analytic plugin module into browser module 28 of a client system 14 at step 205. The content analytic plugin module may be any software or hardware module, or any combination thereof, and may include token generation module 16, translation module 20, rules processing module 22, dictionary store 24, and/or analytics store 26. The content analytic plugin module may be configured to search for specific information (e.g., text, phrases, colloquialisms, and/or symbols) within retrieved text as well as how to display translations associated with the specific information at step 210. For example, the content analytic plugin module may be configured to display translations in parentheses immediately following an associated measurement value or, alternatively, to replace the associated measurement value with the translation itself. Alternatively, server systems 10 and/or client systems 14 may, individually or in combination, include token generation module 16, translation module 20, rules processing module 22, dictionary store 24, and/or analytics store 26 to perform the translation.

Browser module 28 is executed to retrieve a document (e.g., web page or any other structured or unstructured document) at step 215. Token generation module 16 performs content analytics on the text in the retrieved document at step 220 (based on measurement or other annotators 223) and, along with rules processing module 22, generates annotations associated with specific text and/or measurement values within the retrieved document at step 225. The annotators and annotations utilize information within the dictionaries of dictionary store 24 to provide information for translating the specific text. The generated annotations are stored in analytics store 26 with the corresponding text, and are used to transform terms for the specific text within the document at step 230. Browser module 28 may access or be provided with the translations to generate a resulting HyperText Markup Language (HTML) document (or web page) by modifying the original text of the web page to include translations for that text in accordance with the corresponding generated annotations. Browser module 28 dynamically replaces the original HTML document (or web page) with the modified HTML document, where the modified HTML document displayed to the user comprises a view of the original document with changes or modifications to specific text and measurement values according to the generated annotations. Browser module 28 may use any standard HTML replacement methodology or technique, such as JavaScript, to replace the original HTML document. The process ends at step 235.

An embodiment of the present invention may incorporate a natural language processing (NLP) system (e.g., APACHE Unstructured Information Management Architecture (UIMA)) into a web browser as a plugin module. The individual text retrieved from the document may be unstructured, and entered into an Unstructured Information Management Architecture (UIMA) pipeline for translation processing (including annotation generation). The pipeline, by way of example, may be implemented by a native translation layer (e.g., JAVASCRIPT, etc.) on top of a JAVA or C++ implementation of UIMA from APACHE. The translation layer may be compliant with the NETSCAPE Plugin Application Programming Interface (NPAPI) which is a cross-browser Application Programming Interface (API) for plugin modules.

Translations that are produced by the UIMA pipeline (from the generated annotations) may be displayed in the document either in place of, or in addition to, the original text associated with the annotation. Browser module 28 may generate the resulting HTML document by modifying the original text to include translations for the text associated with the corresponding annotations generated by the UIMA pipeline. Browser module 28 dynamically replaces the original HTML document (or web page) with the modified HTML document for display to provide a view of the original document with changes or modifications to specific text and measurement values according to the generated annotations.

Figure 3:
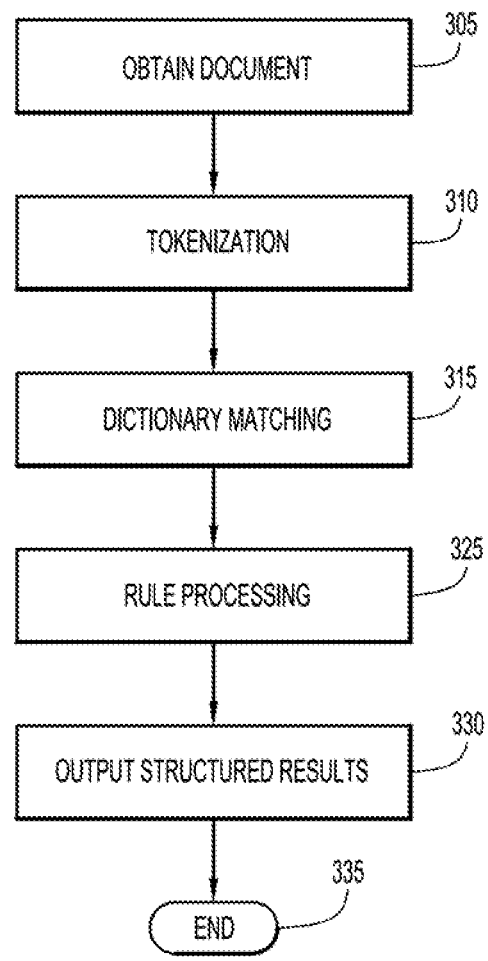
FIG. 3 is a procedural flow chart illustrating a process to dynamically produce a document with translated terms according to an embodiment of the present invention.

A manner in which individual terms, symbols, and/or measurements from documents are translated (e.g., via server systems 10 and/or client systems 14) according to an embodiment of the present invention is illustrated in FIG. 3. Initially, one or more documents with terms from a specific geographic location are retrieved at step 305. The one or more retrieved documents are preferably stored within memory 35 of server systems 10 and/or client systems 14, and/or within database system 18. Each of the one or more retrieved documents is associated with (or has documents produced by members of) a corresponding geographic group or location. For example, a retrieved document may have originated from, or include terms primarily used in, the southeast region of the United States. The particular document to be retrieved may be specified by a user via a user interface provided by browser module 28, and may include terms utilized (or be produced or authored by any group) within any geographic location or region.

Token generation module 16 searches a retrieved document to produce one or more tokens from the retrieved document at step 310. A token may comprise a group of one or more related characters, symbols, terms, punctuation, phrases, and/or colloquialisms stored or located in the retrieved document. The token generation module further identifies the presence of tokens within the one or more dictionaries of dictionary store 24 to generate one or more annotations associated with each identified token at step 315. An annotation may include information pertaining to output types, measurement units, values, processing rules and/or other features that may be associated with a token. An output type associated with a token may be utilized by rules processing module 22 to determine how to process one or more associated tokens. For example, an output type of "valuedtype" may indicate that the translation is the value of the associated token represented in a given measurement unit (e.g., weight, currency, time, size, etc.), and an output type of "operatortype" may indicate that the associated token represents a mathematical operator (e.g., multiply, divide, subtract, etc.) that should be applied to one or more adjacent tokens with an output type of "valuedtype".

Token generation module 16 searches the dictionaries of dictionary store 24 for the presence of a generated token to create an annotation for the generated token. The annotation and corresponding token are stored in analytics store 26. The tokenization and dictionary matching phases (e.g., steps 310 and 315) may employ a state machine to enable token generation module 16 to perform these lexical analysis operations in a single pass as described below.

Rules processing module 22 parses the retrieved document to determine one or more patterns of the generated tokens and generate annotations based on rules associated with the one or more identified patterns at step 325. For example, rules processing module 22 may search for a token pattern of an "operator" type followed by a "valued" type in the same sentence, and generate an annotation applying a corresponding rule to multiply the "operator" type by the "valued" type to determine a value associated with the token pattern. Translation module 20 produces a resulting document by replacing the one or more tokens with the equivalent terms, colloquialisms, and/or values determined from the annotations and associated with the one or more identified token patterns in the original document. The resulting document is displayed to the user in real-time, i.e., as the user is consuming the retrieved document, at step 330. The process ends at step 335.

Figure 4:
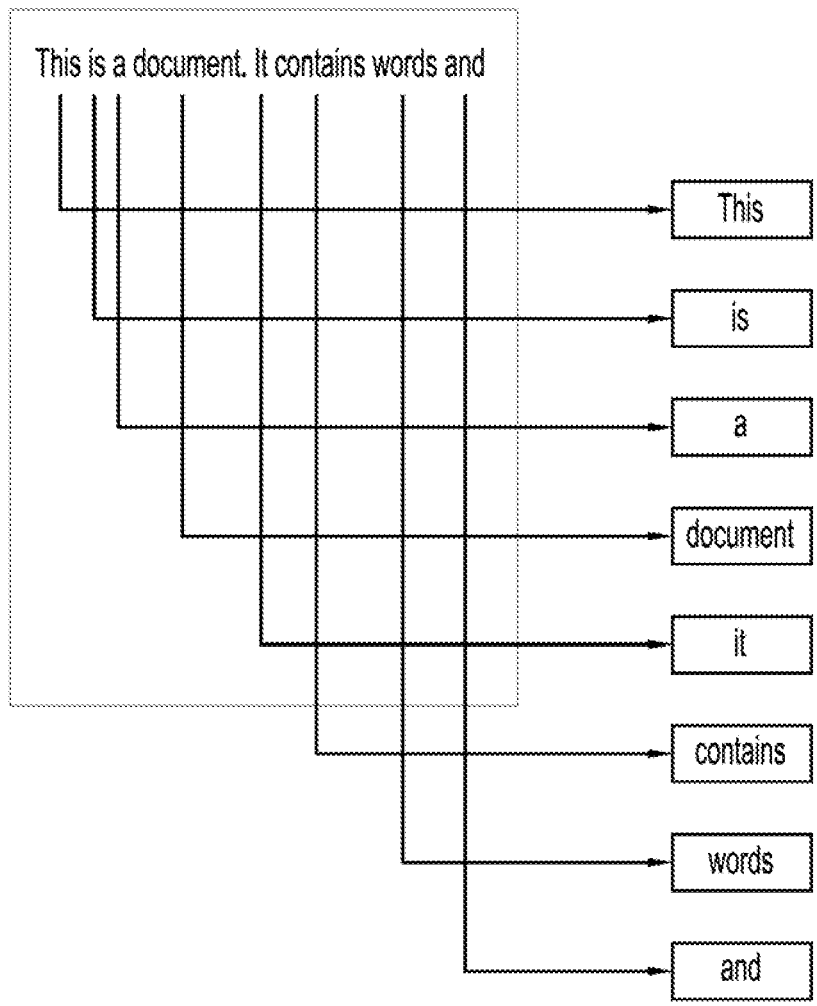
FIG. 4 is a diagrammatic illustration of a manner in which tokens are produced according to an embodiment of the present invention.

A manner in which tokens may be produced from information contained in a document (e.g., via token generation module 16 and server systems 10 and/or client systems 14) according to an embodiment of the present invention is illustrated in FIG. 4. The individual analysis technique may parse the document to determine tokens corresponding to various individual terms, symbols, and/or measurements that are contained within the document (e.g., in accordance with step 310 of FIG. 3 described above). Token generation module 16 may scan the characters and/or symbols from the beginning of the document until encountering an end-of-word marker (e.g., a space, a backslash, or any other symbol or symbols that may indicate that a scanned word or term is complete). For example, token generation module 16 may read the individual characters "T," "h," "i," and "s" (e.g., from the example clause "This is a document. It contains words and" as viewed in FIG. 4) prior to encountering a space character, thereby informing token generation module 16 to concatenate these characters to form the token "This." Token generation module 16 continues to scan the document to form a stream of individual tokens (e.g., "is", "a", "document", "it", "contains", "words", "and" as viewed in FIG. 4) until an end-of-file marker, or similar delimiter, is encountered indicating that token generation module 16 has reached the end of the document. The token generation module may produce a token corresponding to one or more terms (e.g., individual term or word, phrase, clause, sentence, paragraph, page, etc.).

Token generation module 16 determines the presence of the identified tokens within the various dictionaries of dictionary store 24 (e.g., in accordance with step 315 of FIG. 3 described above), and generates corresponding annotations for storage in analytics store 26. During the tokenization and dictionary matching techniques described above (e.g., steps 310 and 315 of FIG. 3), token generation module 16 scans the sampled document only once, thereby enhancing the processing speed and allowing the transformation of tokens and further processing to be executed in near real-time (e.g., as a user consumes the document). This is accomplished by employing a state machine that is loaded with the dictionaries of dictionary store 24 as described below.

Dictionary store 24 may include various dictionaries specifying features for transforming tokens (or terms) from documents. The information for the dictionaries may be combined and stored in a single dictionary, or may be partitioned in any manner among any quantity of dictionaries based on any desired criteria. Example dictionaries for storing features related to tokens is illustrated in FIGS. 5A-5E. Initially, token generation module 16 annotates tokens generated from a document to associate the token with a corresponding dictionary that stores features for that token. The features associated with the annotated tokens enable rules processing module 22 to transform an annotated token into an associated colloquialism and/or value based on at least one of localization information for the requesting system or user device, user reading level, and/or user preferences as described below.

An example dictionary 505 (FIG. 5A) may include several tokens and corresponding features for those tokens. The dictionary may be represented as a table, where each row corresponds to a token (or term) and the columns represent the features for that token. By way of example, dictionary 505 includes the tokens "Dime", "Quarter", "Nickel" and "Penny", each with values for corresponding features of value, weight, volume, color and output type (e.g., "valuedtype" indicates that the translation is the value of the associated token and "operatortype" indicates that the associated token represents a mathematical operator).

Example dictionary 510 (FIG. 5B) may include several tokens (or terms) and corresponding features for those tokens. This dictionary may be represented as a table as discussed above, where each row corresponds to a token and the columns represent the features for that token. By way of example, dictionary 510 includes the tokens "Half" and "Quarter", each with values for corresponding features of value and output type (e.g., "valuedtype" indicates that the translation is the value of the associated token and "operatortype" indicates that the associated token represents a mathematical operator).

Example dictionary 515 (FIG. 5C) may include several tokens (or terms) and corresponding features for those tokens. This dictionary may be represented as a table as discussed above, where each row corresponds to a token (or term) and the columns represent the features for that token. By way of example, dictionary 515 includes the tokens "Century", "Decade", and "Pound", each with values for corresponding features of value, unit of measurement, and output type (e.g., "valuedtype" indicates that the translation is the value of the associated token and "operatortype" indicates that the associated token represents a mathematical operator).

By way of example, translation module 20 may utilize annotations derived from the features of dictionaries 505, 510, and/or 515 to transform the token "Dime" to one or more of the values associated with the corresponding features (e.g., weight, value, volume, and color) (e.g., the translation module may transform the phrase "a handful of dimes" to the corresponding numerical weight, volume, and/or currency value). In addition, the translation module may further use the annotations derived from dictionaries 505, 510, and/or 515 to transform a phrase with an operational token (e.g., "Half", "Quarter", etc.) and a value token (e.g., "Dime", "Century", "Decade", "Pound", etc.) to the corresponding numerical value (e.g., the translation module may transform the phrases "half a dime", "half a century", and "quarter of a pound" to the corresponding numerical values (e.g., $0.05, 50 years, and 4 ounces, respectively). These translated terms appear in the resulting document displayed to the requesting system and/or user device.

Another example dictionary 520 (FIG. 5D) may include several other tokens (or terms) and corresponding features for those tokens. This dictionary may similarly be represented as a table as discussed above, where each row corresponds to a token (or term) and the columns represent the features for that token. By way of example, dictionary 520 may be a beverage dictionary and include the tokens "Soda" and "Pop", each with values (or equivalent terms) for corresponding Regions 1-4.

User localization information may identify a region within a country having one or more sub-regions, wherein each sub-region has different phrases, colloquialisms, or expressions for the same token or term. User localization information may further identify a geographic location sufficiently small as to enable colloquialism differentiation among different users. A region may be any geographical area, including, but not limited to, a country, region, sub-region, state, county, neighborhood, office, and/or home. For example, the features associated with the terms "Soda" or "Pop" are stored in dictionary 520 of dictionary store 24, and indicates that "Pop" should be utilized in a first region (e.g., represented by Region 1) to represent the term "Soda." Similarly, the features stored in dictionary 520 further indicate that "Cola," "Soft Drink," and "Soda Pop" may be used in additional corresponding regions (represented by Regions 2, 3, and 4). In the case of a user location within the first region (represented by Region 1), translation module 20 substitutes "Pop" for the term "Soda" in the resulting document displayed to a requesting system and/or user device located in the first region. The designations and/or determinations for the regions may be based on any suitable indicators or coordinates (e.g., country, state, province, territory, city, town, GPS or other coordinates, latitude/longitude, zip or other postal codes, network address, etc.).

An example dictionary 525 (FIG. 5E) may include several tokens (or terms) and corresponding features for those tokens. This dictionary may be represented as a table as discussed above, where each row corresponds to a token (or term) and the columns represent the features for that token. By way of example, dictionary 525 includes the tokens "quick", "brown", and "lazy", each with values (or equivalent terms) for the corresponding features of reading levels 1 and 2 representing reading levels of varying difficulty (e.g., education or grade levels, etc.).

By way of further example, translation module 20 may transform terms based on a reading level associated with the requesting system and/or user device. For example, translation module 20 may utilize the values (or equivalent terms) in dictionary 525 based on user reading level, and substitute the term "quick" with "fast" or "agile" (represented by Reading Levels 1 and 2). Similarly, translation module 20 may substitute the term "brown" with "chocolate" or "cocoa" (represented by Reading Levels 1 and 2), and the term "lazy" with "tired" or "slovenly" (represented by Reading Levels 1 and 2). Thus, translation module 20 may use annotations derived from dictionary 525 to transform the phrase "the quick brown fox jumped over the lazy dog" to the phrase "the agile cocoa fox leapt atop the slovenly canine," based on the reading level (e.g., Reading Level 2) associated with the requesting system and/or user device.

Figure 6:
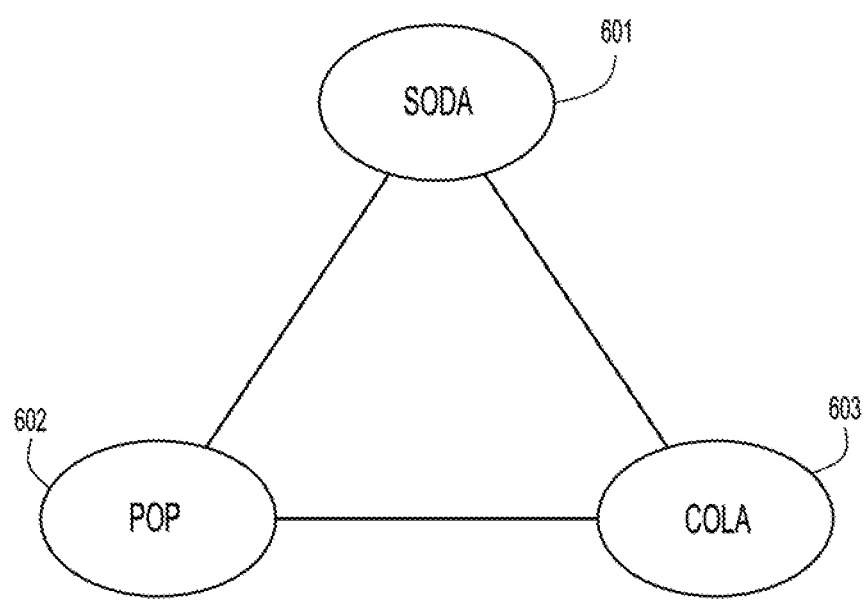
FIG. 6 is a diagrammatic illustration of an example dictionary employing a star schema according to an embodiment of the present invention.

A diagrammatic illustration of an example star schema for a dictionary storing features of corresponding tokens is illustrated in FIG. 6. Star schema dictionaries store a concept term and corresponding translations or equivalent terms in a maximally connected profile, thereby facilitating single word searches and translations. One or more dictionaries of dictionary store 24 may implement a star schema to facilitate the dictionary matching and token annotation processes. For example, a star schema dictionary may be structured such that the generated token is a dictionary entry 601 (e.g., "Soda"), and each possible surface form 602 (e.g., "Pop"), 603 (e.g., "Cola") of the token is a dimension connected to the token entry in the dictionary (e.g., based on parameters, such as location, reading level, etc.). Searching a star schema dictionary for "Soda" 601 may provide "Pop" 602 and "Cola" 603 as possible translations for "Soda" 601. Moreover, a search for either "Pop" 602" or "Cola" 603 may provide access to each of the other terms as possible translations.

Similarly, star schema dictionaries also may be used to allow word replacements that either elevate or lower the reading level associated with the structured document displayed to the user. For example, a user's reading level may be associated with a numeric value and all words, symbols, and values in the document may be transformed based at least on the numeric value associated with the user's reading level. Each dictionary concept may contain all possible translations and, therefore, any translation or equivalent terms associated with a token found in the original text may be located based at least on the localization information for the requesting system or user. Star schema dictionaries may be implemented in a tabular form (e.g., dictionary 520 discussed above for FIG. 5D) that maintains the relationships between concepts and dimensions.

Figure 7:
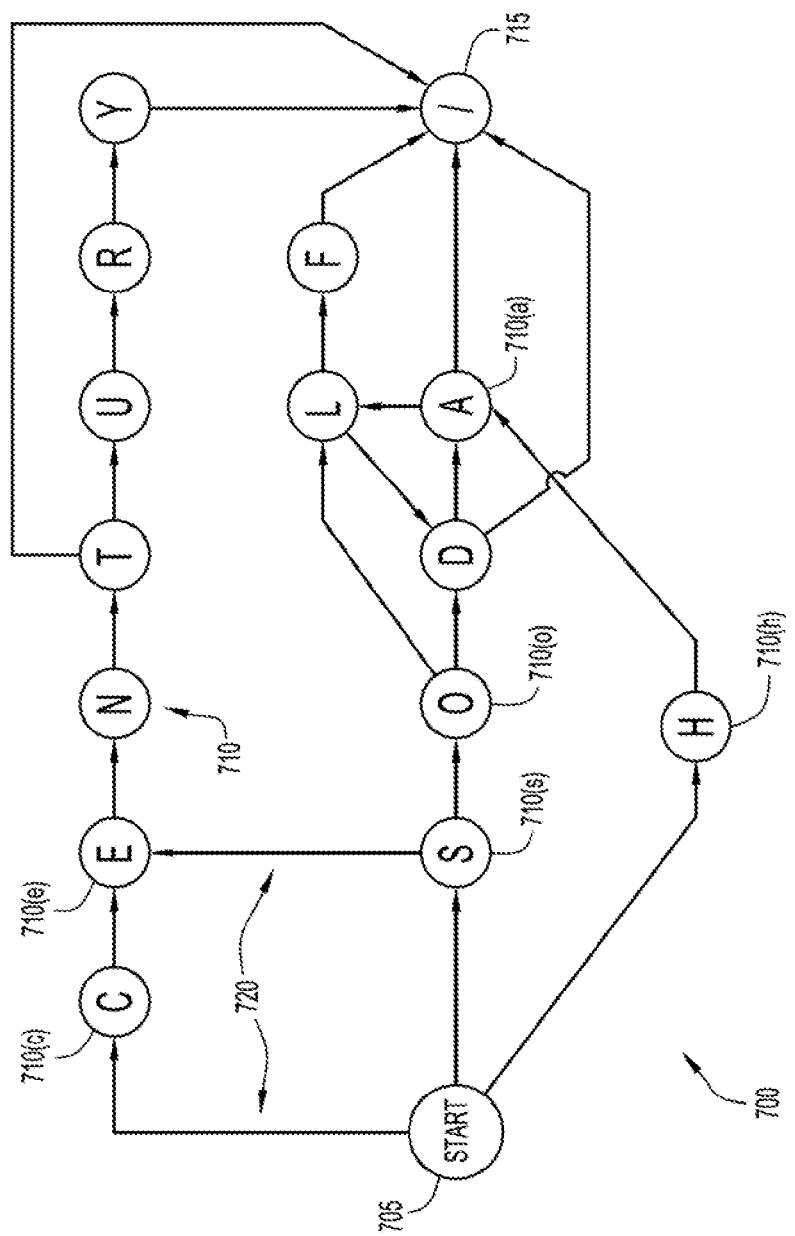
FIG. 7 is a diagrammatic illustration of an example state machine for identifying tokens from a document contained within dictionaries according to an embodiment of the present invention.

A manner in which a state machine is employed to produce tokens and annotations (e.g., via token generation module 16 and server systems 10 and/or client systems 14) is illustrated in FIG. 7. Initially, the state machine may be employed to perform the tokenization and dictionary matching operations (e.g., steps 310, 315 described above for FIG. 3). The state machine enables token generation module 16 to scan a document only once, thereby enhancing the processing speed and allowing the translation of tokens and further processing to be executed in near real-time (e.g., as a user system consumes the document). In addition, the state machine compresses the dictionaries of dictionary store 24 to reduce memory usage, increase memory access and processing speed, and enable the operations to be performed from a plugin module.

An example state machine 700 includes an initial state or node 705, one or more intermediate states or nodes 710 each corresponding to a character or symbol, a terminal state or node 715, and one or more links or state transitions 720 between each pair of states or nodes. The state machine is loaded with the dictionaries of dictionary store 24, where characters of dictionary tokens (or terms) are associated with intermediate states 710 and terminal state 715 includes operations and dictionary content for the corresponding dictionary tokens (or terms). In this case, each path through the state machine comprises one or more states 710, and represents a token within at least one of the dictionaries of dictionary store 24. The corresponding characters associated with the states in a path are concatenated to form the represented token. Thus, the state machine includes paths only for corresponding tokens residing in the dictionaries of dictionary store 24.

The state machine enables the token generation module to quickly identify tokens in dictionary store 24, and to create annotations associated with these tokens. By way of example, state machine 700 includes paths for the tokens "soda", "half", and "century". Terminal state 715 includes operations and dictionary content for the corresponding dictionary tokens encountered in the state machine. These operations direct the token generation module to produce annotations that are stored in analytics store 26 with the corresponding token. The annotations provide information for translating the token.

For example and with respect to a document term "soda", token generation module 16 may initially read a character, "S", from a document, and traverse the state machine from initial state 705 to a state 710(s) (state S) corresponding to that character. The next character, "O", is read from the document. Since a link is present from the current state S to state 710(o) for the character "O" (state O), the state machine is traversed to state O from the current state S. This process continues until an end of a token delimiter (e.g., backslash, space character, etc.) is encountered in the document. Since links exist in the state machine between the states corresponding to the remaining characters (e.g., "D" and "A"), the token generation module reaches terminal state 715, thereby indicating that the term "soda" is a token within dictionary store 24.

Once the terminal state is reached and the token identified, an operation associated with the token is performed to generate an annotation for storage in analytics store 26. Referring to FIG. 8A, the operation may direct token generation module 16 to add a dictionary annotation (e.g., <DICTIONARYBEVERAGEANNOTATION>) for the token in analytics store 26 (e.g., in the case of the token being a non-value term which is replaced with another corresponding term). The dictionary annotation indicates, by way of example, a beverage dictionary containing the token (e.g., dictionary 520), and may include features of the token loaded from that corresponding dictionary. By way of example, the dictionary annotation may include columns or features designating regions (e.g., Regions 1-4) and corresponding equivalent terms for those regions (e.g., "Pop", "Cola", "Soft Drink", and "Soda Pop" from dictionary 520). The regions may be identified based on any suitable indicators or coordinates (e.g., country, state, province, territory, city, town, GPS or other coordinates, latitude/longitude, zip or other postal codes, network address, etc.). Annotations for other non-valued tokens with paths in state machine 700 (e.g., "CENT", "SOLD", etc.) may be generated in substantially the same manner described above.

In the case of a token with an operational or valued output type (e.g., indicating a more complex translation), a similar approach is utilized, but different annotations are generated to accommodate these tokens. For example and with respect to a document term "half" having an operational output type, token generation module 16 may initially read a character, "H", from a document, and traverse the state machine (FIG. 7) from initial state 705 to a state 710(h) (state H) corresponding to that character. The next character, "A", is read from the document. Since a link is present from the current state H to state 710(a) for the character "A" (state A), the state machine is traversed to state A from the current state H. This process continues until an end of a token delimiter (e.g., backslash, space character, etc.) is encountered in the document. Since links exist in the state machine between the states corresponding to the remaining characters (e.g., "L" and "F"), the token generation module reaches terminal state 715, thereby indicating that the term "half" is a token within dictionary store 24.

Once the terminal state is reached and the token identified, a dictionary annotation is generated and stored in the analytics store to identify the corresponding dictionary (e.g., <DICTIONARY[TYPE]ANNOTATION>, where '[TYPE]' represents the dictionary name or type). In addition, an operation associated with the token is performed to generate another annotation for storage in analytics store 26. Referring to FIG. 8B, the operation may direct token generation module 16 to add a multiplier value annotation (<MULTIPLIERVALUEANNOTATION>) for the token in analytics store 26 since the token is of an operational output type. The multiplier value annotation may include features of the token loaded from a corresponding dictionary (e.g., dictionary 510). By way of example, the multiplier value annotation may include the value of the multiplier for this token (e.g., multiplier value of 0.5 for the token "half") loaded from dictionary 510.

For example and with respect to a document term "century" with a valued output type, token generation module 16 may initially read a character, "C", from a document, and traverse the state machine (FIG. 7) from initial state 705 to a state 710(c) (state C) corresponding to that character. The next character, "E", is read from the document. Since a link is present from the current state C to state 710(e) for the character "E" (state E), the state machine is traversed to state E from the current state C. This process continues until an end of a token delimiter (e.g., backslash, space character, etc.) is encountered in the document. Since links exist in the state machine between the states corresponding to the remaining characters (e.g., "N", "T", "U", "R", and "Y"), the token generation module reaches terminal state 715, thereby indicating that the term "century" is a token within dictionary store 24.

Once the terminal state is reached and the token identified, a dictionary annotation is generated and stored in the analytics store to identify the corresponding dictionary (e.g., <DICTIONARY[TYPE]ANNOTATION>, where '[TYPE]' represents the dictionary name or type). In addition, an operation associated with the token is performed to generate another annotation for storage in analytics store 26. Referring to FIG. 8C, the operation may direct token generation module 16 to add a valued annotation (<VALUEDANNOTATION>) for the token in analytics store 26 since the token is of a valued output type. The valued annotation may include features of the token loaded from a corresponding dictionary (e.g., dictionary 515). By way of example, the valued annotation may include the values of the corresponding features for the token (e.g., a value of 100 and units of years) loaded from dictionary 515.

Thus, the tokens in analytics store 26 may include plural annotations (e.g., a dictionary annotation and a multiplier value and/or valued annotation) to produce translations as described below (e.g., the token "half" may include a dictionary annotation (e.g., <DICTIONARY[TYPE]ANNOTATION>) and a multiplier value annotation (e.g., <MULTIPLIERVALUEANNOTATION>), while the token "century" may include a dictionary annotation (e.g., <DICTIONARY[TYPE]ANNOTATION>) and a valued annotation (e.g., <VALUEDANNOTATION>) to direct translation of those terms).

If no path exists in the state machine (FIG. 7) between the initial and terminal states for a term (e.g., "SOCK", etc.) being read from the document (e.g., no link exists between a current state (e.g., state O of SOCK) and a next state (e.g., state C of SOCK) associated with a succeeding character), this indicates that the term being read does not reside in dictionary store 24 and no translation information is generated. However, since the term may be a literary or other token, a token for the term is stored in analytics store 26.

Once the tokens and corresponding annotations are stored in analytics store 26, rule processing is performed (e.g., in accordance with step 325 of FIG. 3) to generate further annotations for applying rules to transform an annotated token. Rules processing module 22 searches for patterns of tokens in the document associated with one or more rules, and performs additional processing based on the identified token patterns as described below.

Referring to FIG. 9, an example rule may specify to multiply a value of an operational token (e.g., with an output type of "operatortype") by a value of a valued token (e.g., with an output type of "valuedtype") to produce an annotation for storage in analytics store 26. A token pattern is associated with the rule, and may require that an operational token reside in the same sentence as a valued token to apply the rule. By way of example, a document may contain the sentence, "The effect lasted half a century," which includes the operational token "half" (e.g., indicated by dictionary 520) and the valued token "century" (e.g., indicated by dictionary 525) in the same sentence. Since this sentence complies with the pattern for the example rule, rules processing module 22 creates an entry in analytics store 26 for the phrase "half a century", and further generates an annotation for this phrase. The annotation is generated by applying the rule to multiply a value of the operational token "half" (e.g., 0.5 as indicated by dictionary 520) by the value of the valued token "century" (e.g., 100 years as indicated by dictionary 525), thereby producing a translation of "50 years". The transformation is placed in the annotation which is stored for the phrase (e.g., "half a century") in analytics store 26.

The rules may provide operations for various types of transformations, including those with compositions of annotations. For the scenario in which a concrete value is assigned to some portion of text (e.g., "century=100 years"), this concrete value could be composed with other annotations that expect a numeric value and some intrinsic operation could be performed. This could be achieved by naming conventions (e.g., feature names being able to be operated on by an operational annotation as described above), or by using a type system or other metadata catalog that defines annotations that are able to be composed. For example, the phrase "half a century ago" may be converted to "50 years ago", while the phrase "a handful of dimes" may be converted to a dollar amount.

Composite operators may allow combinations of other analysis algorithms to be chained together as a state machine or subflow in processing. For example, a "half" operator, keying on the word "half" in the phrase "half a century ago" may retrieve the numeric value of the annotation covering "century" and modify that value to 50. This modified value is used at run time for display purposes. Similarly, a dictionary may include a "handful" operator with the average volume of a human hand, and a rule may specify to calculate a number of items that fit inside that volume and, consequently, a value of total objects. Generically, this employs aspect matching across objects (e.g., matching the volumes to compute relationships, such as "how many would fit"), and event notification to other features to recalculate their values.

The text in a document determines which annotations ultimately are composed together. For example, an annotation A may be combined with annotations B and C. If the text does not trigger annotation A, the values in annotations B and C would remain unchanged.

Figure 10:
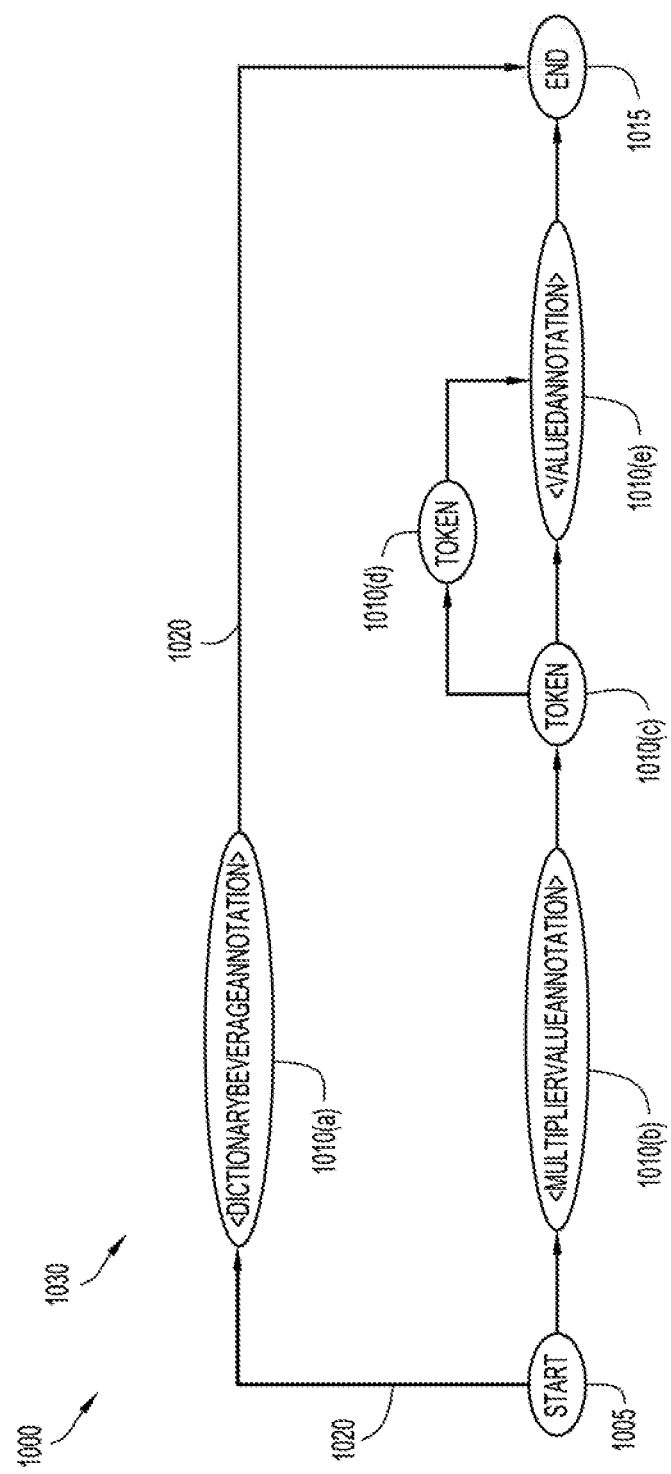
FIG. 10 is a diagrammatic illustration of an example state machine for identifying patterns of tokens within a document to apply rules according to an embodiment of the present invention.

A manner in which a state machine is employed to identify token patterns in a document and apply corresponding rules to generate annotations (e.g., via rules processing module 22 and server systems 10 and/or client systems 14) is illustrated in FIG. 10. Initially, the state machine may be employed to perform the rules processing operations (e.g., step 325 described above for FIG. 3). An example state machine 1000 includes an initial state or node 1005, one or more intermediate states or nodes 1010 each corresponding to an annotation or token, a terminal state or node 1015, and one or more links or state transitions 1020 between each pair of states or nodes. The state machine is loaded with token patterns, corresponding rules, and dictionary content to perform transformations. In this case, each path through the state machine comprises one or more states 1010, and represents a token pattern corresponding to at least one of the rules. Thus, the state machine includes paths only for corresponding token patterns associated with the rules.

The state machine enables the rules processing module to quickly identify token patterns, and to create annotations based on the corresponding rules associated with these token patterns. By way of example, state machine 1000 includes paths for a token pattern 1020 (e.g., represented by state or node 1010(a)) having a token with a dictionary beverage annotation (e.g., <DICTIONARYBEVERAGEANNOTATION>), and a token pattern 1030 (e.g., represented by states or nodes 1010(b), 1010(c), 1010(d), and 1010(e)) with a first token having a multiplier value annotation (e.g., <MULTIPLIERVALUEANNOTATION), second and/or third tokens (regardless of the type of any annotations), and a fourth token with a valued annotation (e.g., <VALUEDANNOTATION>). Each of these paths is associated with a corresponding rule to determine a translation. Terminal state 1015 includes operations, rules, and/or dictionary content for the various token patterns encountered in the state machine. The operations direct the rules processing module to apply the corresponding rule and produce annotations that are stored in analytics store 26 with the corresponding token or phrase complying with the token pattern. The annotations may provide the transformation itself, or information for performing the transformation.

For example and with respect to the document token "soda" discussed above, rules processing module 22 may initially retrieve this token (e.g., from processing the document) and type of corresponding annotation (e.g., <DICTIONARYBEVERAGEANNOTATION> (FIG. 8A)) for the token from analytics store 26. The rules processing module traverses the state machine from initial state 1005 to state 1010(a) corresponding to the type of annotation (e.g., <DICTIONARYBEVERAGEANNOTATION>) for that token. Since pattern 1020 does not comprise further states, terminal state 1015 is reached, thereby indicating that the token "soda" complies with pattern 1020 of a rule.

Once the terminal state is reached, an operation associated with the pattern and specified by a rule is performed to generate an annotation for storage in analytics store 26. Referring to FIG. 11A, the operation may direct rules processing module 22 to add a translatable annotation (e.g., <TRANSLATABLEANNOTATION>) for the token in analytics store 26. The translatable annotation basically serves as a flag and indicates, by way of example, replacement of the token with an equivalent term based on various parameters (e.g., location, reading level, etc.). Thus, the tokens in analytics store 26 may include plural annotations (e.g., a dictionary annotation and a translatable annotation) to produce transformations as described below (e.g., the token "soda" may include a dictionary beverage annotation (e.g., <DICTIONARYBEVERAGEANNOTATION>) and a translatable annotation (e.g., <TRANSLATABLE ANNOTATION>) to direct transformation of that token).

For example and with respect to the document phrase "half a century" discussed above, rules processing module 22 may initially retrieve the token "half" (e.g., from processing the document) and a type of the corresponding annotation (e.g., <MULTIPLUERVALUEANNOTATION>) from analytics store 26. Rules module 22 traverses state machine 1000 (FIG. 10) from initial state 1005 to a state 1010(b) corresponding to the type of annotation (e.g., <MULTIPLIERVALUEANNOTATION>) for that token. The next token, "a", is retrieved (e.g., from processing the document) along with a type of any corresponding annotation in analytics store 26. Since a link is present from the current state 1010(b) to state 1010(c) associated with a token (regardless of the type of any annotation), the state machine is traversed to state 1010(c) from current state 1010(b). The final token "century" is retrieved (e.g., from processing the document) along with the type of the corresponding annotation (e.g., <VALUEDANNOTATION>) from analytics store 26. Since a link is present from current state 1010(c) to state 1010(e) corresponding to the type of annotation (e.g., <VALUEDANNOTATION>) for that token, the state machine is traversed to state 1010(e) from current state 1010(c). Since pattern 1030 does not comprise further states, terminal state 1015 is reached, thereby indicating that the phrase "half a century" complies with pattern 1030 of a rule.

Once the terminal state is reached, an operation associated with the pattern and specified by a rule is performed to generate an entry for the phrase and an annotation for storage in analytics store 26. Referring to FIG. 11B, the operation may direct rules processing module to add an operation value annotation (e.g., <OPERATIONVALUEANNOTATION>) for the phrase in analytics store 26. The operation value annotation includes features of product and units. The product feature is determined by applying a rule specifying to multiply a value of the operational token (e.g., 0.5 as indicated by dictionary 510 for the token "half" with <MULTIPLIERVALUEANNOTATION>) by a value of a valued token (e.g., 100 as indicated by dictionary 515 for the token "century" with <VALUEDANNOTATION>), thereby resulting in a value of 50 (0.5*100=50). The units feature corresponds to the value of units for the valued token (e.g., years as indicated by dictionary 515 for the token "century"). These values are loaded from the corresponding dictionaries.

The tokens are preferably retrieved in a sequential manner for detection of patterns. If no path exists in the state machine (FIG. 10) between the initial and terminal states for a sequence of one or more tokens from the document (e.g., no link exists between a current state and a next state), no rule exists for that token sequence and the next token sequence is processed to identify a pattern for application of a corresponding rule. In addition, annotations are preferably generated and stored for tokens or phrases in analytics store 26 when the generated annotations do not already exist in the analytics store for those tokens or phrases (e.g., to avoid duplicate annotations for tokens or phrases appearing plural times in a document).

Once the annotations are generated and stored in analytics store 26, translation module 20 processes the annotations to produce transformations for the corresponding annotated tokens and/or phrases (e.g., in accordance with step 330 described above for FIG. 3). In particular, the translation module retrieves parameters associated with the user or user system (e.g., location, reading level, etc.). For example, the translation module may determine a desired location based on a user-selected location, geolocation information (e.g., GPS or other coordinates), network address, and/or a user system locale (e.g., with a manual override in the case of a user traveling or relocating but not yet familiar with local phrasings or measures). This information may be used to determine corresponding locations employed by the dictionaries (e.g., country, state, province, territory, city, town, GPS or other coordinates, latitude/longitude, zip or other postal codes, network address, etc.).

Further, the translation module may enable the user to select a desired reading level, or perform an automatic determination of the reading level (e.g., the reading level of documents read by the user over time may be assumed to be indicative of the user reading level preference, etc.).

Translation module 20 identifies the tokens with translatable annotations (e.g., <TRANSLATABLEANNOTATION>) in analytics store 26, and applies the parameters to the features of dictionary annotations for those tokens to determine the corresponding translations for the user. For example, the translation module may transform the token "soda" from a document for a user from Region 1 to "pop" according to features within a corresponding beverage dictionary annotation for that token in analytic store 26 (e.g., FIGS. 8A and 11A). These translations may be further utilized to modify the computed translations or measurements. For example, the phrase "a dozen sodas" may be transformed into "12 pops" based on the token soda being translated to "pop" according to a geographic location. Further, annotations may be generated for complex or nested expressions (e.g., "a half dozen sodas" may be translated to "6 pops", etc.).

Translation module 20 utilizes these translations and the translations produced for tokens and/or phrases having the operation value annotation (e.g., "50 years" for "half a century" as described above for FIG. 11B) to replace the corresponding terms and/or phrases in the document to produce a resulting document for display. For example, a resulting web page may be generated by modifying the original text of the web page to include translations for that text in accordance with the corresponding generated annotations. The original HTML document (or web page) is dynamically replaced with the modified HTML document, where the modified HTML document displayed to the user comprises a view of the original document with changes or modifications to specific text and measurement values according to the generated annotations. Any standard HTML replacement methodology or technique, such as JavaScript, may be utilized to replace the original HTML document.

It will be appreciated that the embodiments described above and illustrated in the drawings represent only a few of the many ways of implementing embodiments for dynamic token translation for network interfaces.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.).

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, token generation module, rules processing module, translation module, etc.). These systems may include any types of monitors and input devices (e.g., keyboard, mouse, voice recognition, etc.) to enter and/or view information.

It is to be understood that the software (e.g., token generation module, rules processing module, translation module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., token generation module, rules processing module, translation module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., documents, terms or tokens, annotations, dictionaries, state machine information, etc.). The database system may be implemented by any number of any conventional or other databases, data stores or storage structures (e.g., files, databases, data structures, data or other repositories, etc.) to store information (e.g. documents, terms or tokens, annotations, dictionaries, state machine information, etc.). The database system may be included within or coupled to the server and/or client systems. The database systems and/or storage structures may be remote from or local to the computer or other processing systems, and may store any desired data (e.g., documents, terms or tokens, annotations, dictionaries, state machine information, etc.).

The present invention embodiments may employ any number of any type of user interface (e.g., Graphical User Interface (GUI), command-line, prompt, etc.) for obtaining or providing information (e.g., documents, analytics, annotations, user or other preferences, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user (e.g., documents, analytics, annotations, user or other preferences, etc.).

The present invention embodiments are not limited to the specific tasks or algorithms described above, but may be utilized for any types of documents (e.g., web pages, word processing or other application (e.g., spreadsheets, presentations, etc.) documents, documents with structured and/or unstructured content, etc.) to perform any types of conversions or translations for textual or other types of terms or phrases. The tokens and phrases may have any quantity of annotations to perform the translations, where tokens may be used in different manners. For example, the term "quarter" may be used as a value and an operator (e.g., three quarters ($0.75) or a quarter of a century (25 years)). In this case, the translation for theses uses may be distinguished by different rules and corresponding patterns. The annotations may include any identifiers, and contain any desired information and/or features (e.g., dictionary content, dictionary identifiers, operations, computation results, equivalent terms (e.g., slang, different words/phrases in the same or different native languages, etc.) to enable the translations.

Further, the translations may be provided for any quantity of terms or grouping of terms (e.g., one or more terms, phrases, clauses, sentences, paragraphs, pages, etc.). For example, phrase rules may be used to replace entire phrases for common phrases. In the case of rules, each phrase rule may provide annotations to produce equivalent phrasings. The annotations are used to substitute phrases at runtime in substantially the same manner described above for terms.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of dynamically producing a document with transformed terms comprising:
    analyzing a retrieved document using one or more natural language processing (NLP) translation techniques to identify one or more terms with equivalent expressions in the same natural language and provide annotations, wherein at least one equivalent expression includes an equivalent numerical expression and an annotation for corresponding identified terms of the equivalent numerical expression includes values and a mathematical operation to determine the equivalent numerical expression;
    transforming the identified terms to the equivalent expressions identified by the one or more NLP translation techniques based on at least the annotations, wherein the mathematical operation is performed on the values to produce the equivalent numerical expression; and
    producing a transformed document for display by replacing the identified one or more terms in the retrieved document with the equivalent expressions.

2. The method of claim 1, wherein the retrieved document includes a web page.

3. The method of claim 1, wherein at least one of the identified terms is transformed based on a geographic location, and the geographic location includes a region within a country having at least two regions associated with equivalent expressions.

4. The method of claim 1, wherein an identified term includes a measurement in a first unit of measure, and an equivalent term includes a different unit of measure.

5. The method of claim 1, wherein at least one of the identified terms is transformed based on a geographic location, and the geographic location is determined from one of a group of user-specified location, geolocation information, and location of a computer system of the user.

6. The method of claim 1, wherein transforming each of the identified terms to one of the equivalent expressions is further based on a specified reading level of the user.

7. The method of claim 1, wherein transforming each of the identified terms comprises:

converting one or more identified terms to an equivalent expression utilizing a conversion of at least one prior identified term.

8. The method of claim 1, wherein transforming each of the identified terms comprises:
traversing a state machine to determine whether the identified one or more terms are stored in a dictionary containing transformation information.

9. A system for dynamically producing a document with transformed terms comprising:
a computer system including at least one processor configured to:
analyze a retrieved document using one or more natural language processing (NLP) translation techniques to identify one or more terms with equivalent expressions in the same natural language and provide annotations, wherein at least one equivalent expression includes an equivalent numerical expression and an annotation for corresponding identified terms of the equivalent numerical expression includes values and a mathematical operation to determine the equivalent numerical expression;
transform the identified terms to the equivalent expressions identified by the one or more NLP translation techniques based on at least the annotations, wherein the mathematical operation is performed on the values to produce the equivalent numerical expression; and
produce a transformed document for display by replacing the identified one or more terms in the retrieved document with the equivalent expressions.

10. The system of claim 9, wherein the retrieved document includes a web page.

11. The system of claim 9, wherein at least one of the identified terms is transformed based on a geographic location, and the geographic location includes a region within a country having at least two regions associated with equivalent expressions.

12. The system of claim 9, wherein an identified term includes a measurement in a first unit of measure, and an equivalent term includes a different unit of measure.

13. The system of claim 9, wherein at least one of the identified terms is transformed based on a geographic location, and the geographic location is determined from one of a group of user-specified location, geolocation information, and location of a computer system of the user.

14. The system of claim 9, wherein transforming each of the identified terms to one of the equivalent expressions is further based on a specified reading level of the user.

15. The system of claim 9, wherein transforming each of the identified terms comprises:
converting one or more identified terms to an equivalent expression utilizing a conversion of at least one prior identified term.

16. The system of claim 9, wherein transforming each of the identified terms comprises:
traversing a state machine to determine whether the identified one or more terms are stored in a dictionary containing transformation information.

17. A computer program product for dynamically producing a document with transformed terms comprising:
a computer readable storage medium having program instructions embodied therewith, the program instructions executable by a processor to cause the processor to:
analyze a retrieved document using one or more natural language processing (NLP) translation techniques to identify one or more terms with equivalent expressions in the same natural language and provide annotations, wherein at least one equivalent expression includes an equivalent numerical expression and an annotation for corresponding identified terms of the equivalent numerical expression includes values and a mathematical operation to determine the equivalent numerical expression;
transform the identified terms to the equivalent expressions identified by the one or more NLP translation techniques based on at least the annotations, wherein the mathematical operation is performed on the values to produce the equivalent numerical expression; and
produce a transformed document for display by replacing the identified one or more terms in the retrieved document with the equivalent expressions.

18. The computer program product of claim 17, wherein an identified term includes a measurement in a first unit of measure, and an equivalent term includes a different unit of measure.

19. The computer program product of claim 17, wherein transforming each of the identified terms to one of the equivalent expressions is further based on a specified reading level of the user.

20. The computer program product of claim 17, wherein transforming each of the identified terms comprises:
traversing a state machine to determine whether the identified one or more terms are stored in a dictionary containing translation information.

* * * * *